Dec. 30, 1947. W. W. MUMFORD 2,433,387
ULTRA HIGH FREQUENCY RECEIVER
Filed Dec. 31, 1943 3 Sheets-Sheet 1

INVENTOR
W. W. MUMFORD
BY
George C. Ford
ATTORNEY

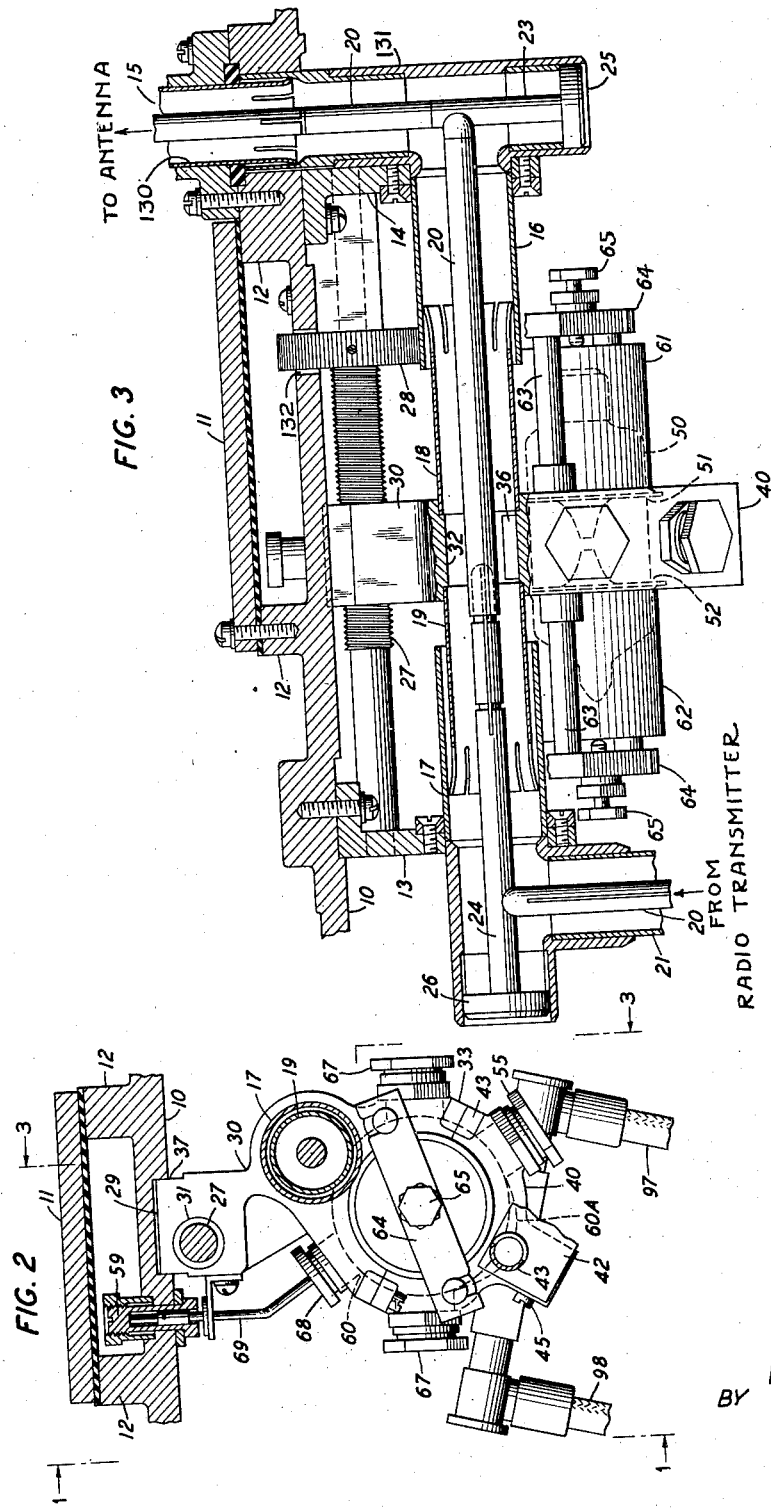

Dec. 30, 1947.  W. W. MUMFORD  2,433,387
ULTRA HIGH FREQUENCY RECEIVER
Filed Dec. 31, 1943  3 Sheets-Sheet 3
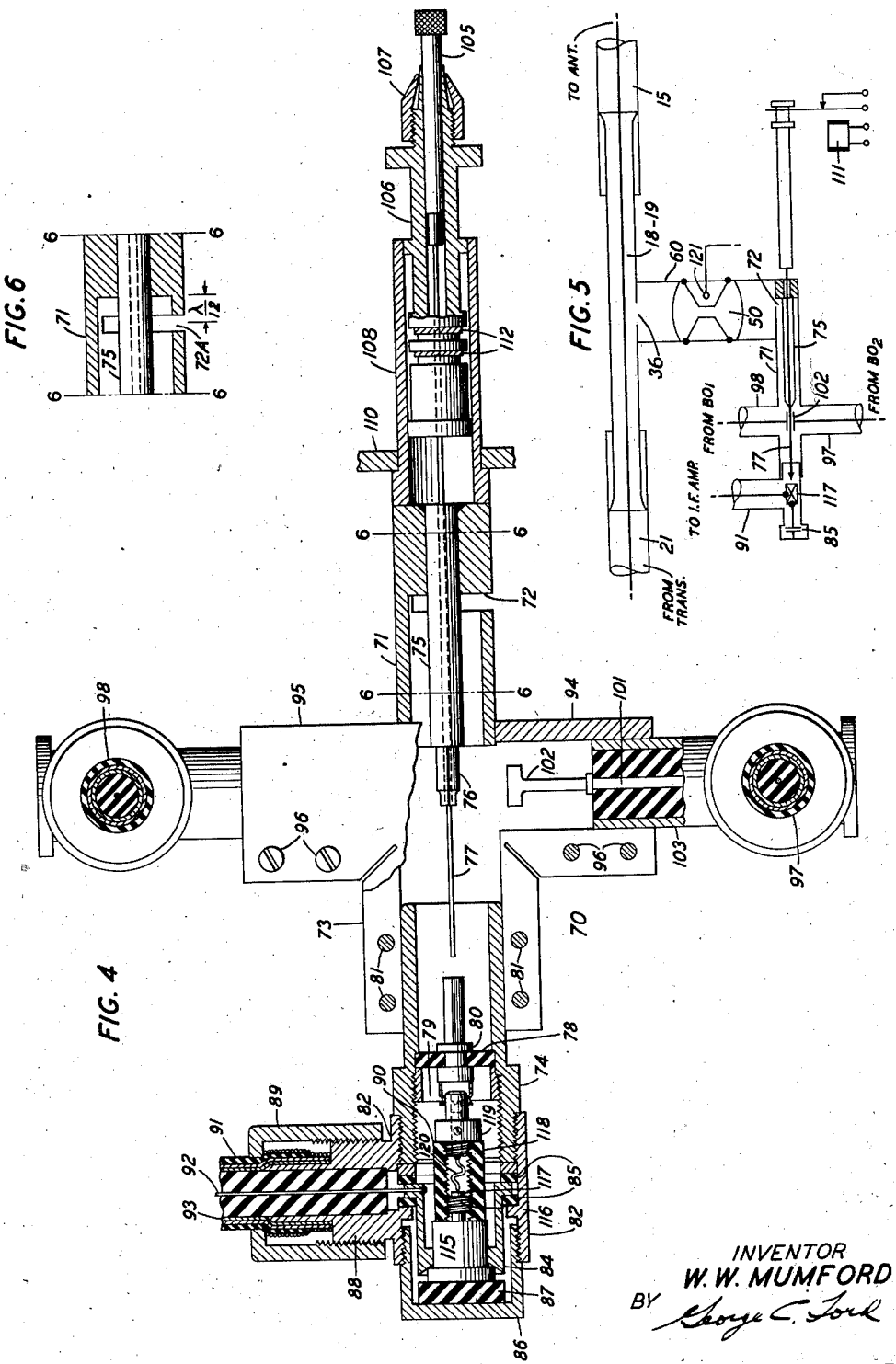
INVENTOR
W. W. MUMFORD
BY
ATTORNEY Patented Dec. 30, 1947

2,433,387

UNITED STATES PATENT OFFICE 2,433,387

ULTRA HIGH FREQUENCY RECEIVER

William W. Mumford, Eatontown, N. J., assignor to Bell Telephone Laboratories, Incorporated, New York, N. Y., a corporation of New York Application December 31, 1943, Serial No. 516,390

5 Claims. (Cl. 250—20)

This invention relates to crystal detectors such as those used in converters or first detectors of superheterodyne radio receivers and particularly to crystal type converters for the receivers of pulse type radio object location and distance measuring systems.

In the operation of superheterodyne receivers in the ultra-high frequency or microwave range it has been found advantageous to employ crystal elements as the first detectors. Such crystal detectors or modulators have the advantage over most other types now available for operation in such frequency ranges that they operate at a much lower noise level thus giving an over-all improvement in signal to noise ratio. On the other hand they have the disadvantages that they do not amplify but in fact operate at a loss and also are susceptible to damage by abnormal voltages. Because of this first characteristic it is desirable that the circuit in which the crystal is used should give as efficient transmission as possible. Because of the second characteristic it is necessary to protect the crystal not only against high voltages that may be developed in the system in which the crystal is employed but also against high radio frequency voltages that may be induced by other systems or apparatus operating in the neighborhood.

In one general type of radar system, i. e., systems for the location of objects and measurement of distance by reflected radio waves, recurrent short pulses of radio waves of high intensity are transmitted and the resultant waves reflected by the objects under observation are received back at the transmission point. In such a system particularly when crystal elements are used in the first detector of the receiver it is necessary to protect the receiver from the high radio frequency voltages produced during the operation of the transmitter. Since the more usual practice is to employ a common antenna for the transmitter and receiver this is accomplished by the use of a duplexing unit. One type of duplexing unit now widely used for this purpose is the so-called "T-R box." Such a unit comprises a resonant chamber or line with an associated gas discharge device properly located in the lines interconnecting the antenna with the transmitter and receiver. Such a unit will operate as a switch to disconnect effectively the receiver from the antenna due to the breakdown of the gas tube during the period of the transmitted pulse while permitting transmission from the antenna to the receiver in absence of such high radio frequency fields in the resonant cavity.

The breakdown of the gas tube is facilitated by the presence of electrically charged particles furnished by an auxiliary discharge maintained by a high negative voltage applied to an igniter electrode. During stand-by periods when the auxiliary discharge is absent, however, such a device will not protect the receiver against radio frequency fields produced by another transmitter operating in the neighborhood and sufficiently strong to injure the crystal.

An object of the invention is to improve the operation of crystal first detectors in systems of the type described above.

A further object of the invention is to improve the transmission of the circuits connecting the crystal element to the remainder of the system.

A still further object of the invention is to protect the crystal element of such systems against radio frequency fields produced by external apparatus.

In a specific preferred embodiment of the invention in a first detector of a superheterodyne radio receiver for a recurrent pulse type object locating and distance measuring equipment, the crystal unit is mounted in a structure that constitutes a resonant concentric transmission line to which the radio frequency signal oscillations and the beating oscillations are supplied. One end of this transmission line is short-circuited and the signal oscillations are supplied at that point through an aperture in the outer conductor that provides coupling to the resonant cavity duplexing element or "T-R box." This use of an aperture at the short-circuited end of the resonant line not only gives high electrical efficiency but also provides a very satisfactory mechanical arrangement. In order to protect the crystal against radio frequency fields during stand-by periods when the igniter is off and the duplexing element is ineffective, the inner conductor of the resonant line is arranged to fit into a chuck at the crystal end and to be moved longitudinally by a relay mechanism so that it can be withdrawn from the chuck to open the electrical circuit to the crystal. In this way the crystal is disconnected when the system is not in operation and thereby protected from external radio frequency fields.

The invention may be more fully understood by reference to the following description in connection with the drawing which shows one embodiment in a first detector of a superheterodyne radio receiver of the invention and in which:

Fig. 2 is a sectional view taken along the line 2—2 of Fig. 1;

Fig. 3 is a sectional view taken along the line 3—3 of Fig. 2;

Fig. 4 is an enlarged sectional view of the resonant line portion;

Fig. 5 is a schematic diagram; and

Fig. 6 is a sectional view of a modification of that portion of the apparatus between the dotted lines 6—6 of Fig. 4.

Figure 1:
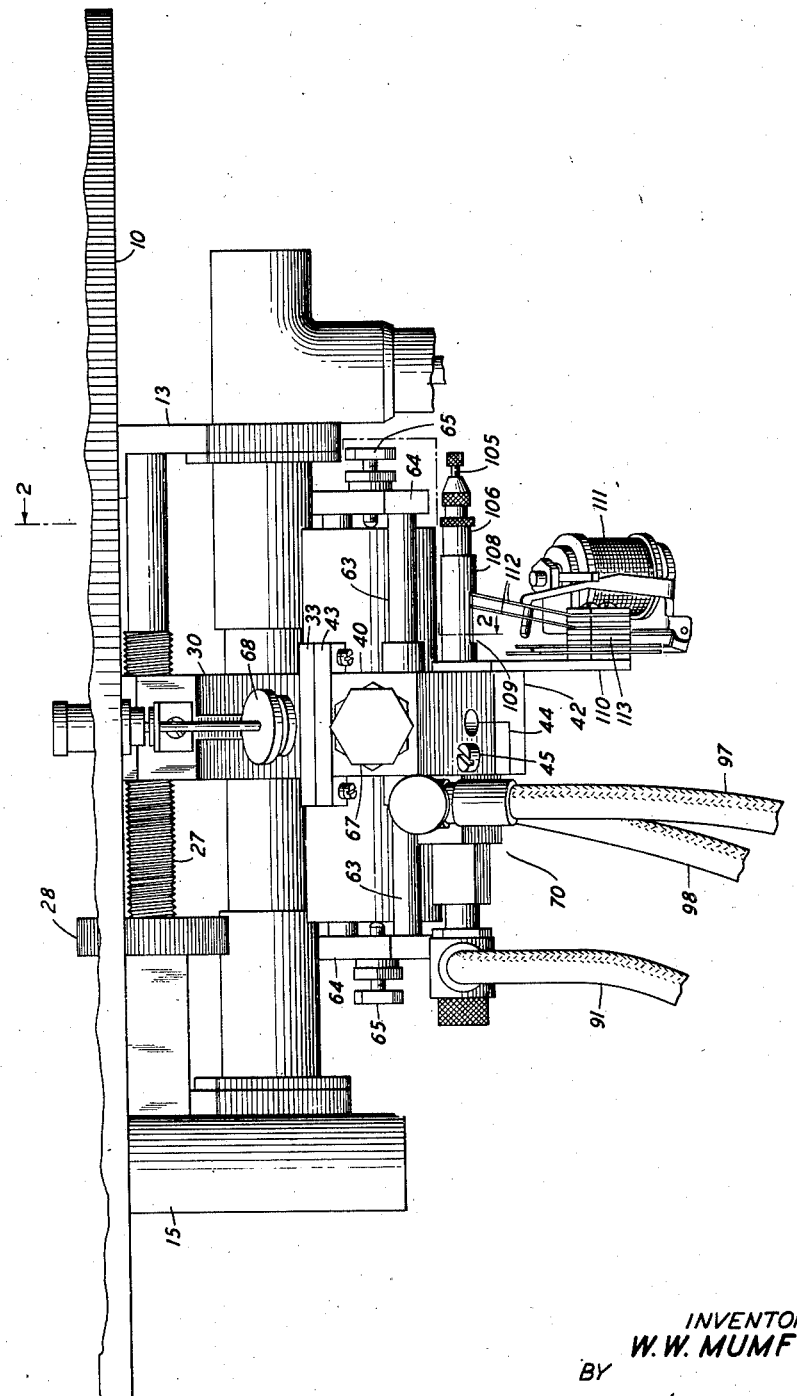
Fig. 1 is a side elevation.

The apparatus shown in the drawing is a portion of the radio frequency unit all of which is arranged for mounting in a cylindrical, pressurized container in order to permit its use in high altitude airplanes without encountering difficulties due to the lower spark-over voltages in the rarified atmosphere at higher altitudes. The apparatus is suspended on the inner surface of the cover plate 10 of such a container (not shown). An auxiliary air-tight cover plate 11 that fits on a boss 12 permits access to certain controls. The apparatus is supported by two brackets 13 and 14 which are bolted to the main cover plate 10.

A concentric transmission line 15 extends through the cover plate 10 and leads to an antenna (not shown). The upper end of this line 130 includes a fitting that permits detachment from the line section within the container but which will not be described in detail as it forms no part of the present invention.

Within the container the transmission line comprises a vertical section of outer conductor 131 supported by the cover 10 and the bracket 14. A short distance below the cover 10 the line turns and becomes horizontal. For a short distance on the right-hand end (as viewed in Fig. 3) the outer conductor is made up of the tubular element 16. At the left-hand end (as viewed in the same Fig. 3) the outer conductor comprises a similar tubular section 17. Between the sections 16 and 17 the outer conductor is made up of two integrally mounted sections 18 and 19 that slide within the sections 16 and 17 and are provided with flared and slotted ends. This construction gives good electrical contact between the respective sections 18 and 16 and 19 and 17. The purpose of this type of construction is to permit a control of the point on the horizontal section of line at which the connection to the duplexing unit and radio receiver is tapped off as will be described in detail later.

The outer conductor section 17 is supported by the bracket 13 and in turn supports a downwardly extending tubular section 21. This section 21 together with its associated inner conductor 20 constitutes the end of the concentric line leading to the radio transmitter (not shown).

The inner conductor 20 of these transmission line sections is itself made up in sections with proper end fittings to facilitate assembly. The inner conductor 20 is supported by two stub sections 23 and 24. These stub sections are in turn supported respectively by the members 25 and 26 that are mechanically and electrically integral with the corresponding outer conductors. As is understood in the art such stub supports are proportioned to be a quarter wavelength long at the operating frequency. Accordingly, having a substantially zero impedance at their ends, they have a substantially infinite impedance at the junctions with the transmission line proper and provide the equivalent of perfect insulation with full metallic support of the inner conductor.

A lead screw 27 is journaled in the brackets 13 and 14. Attached to the screw 27 by means of a set screw is a knurled wheel 28 which extends through an opening 132 in the cover 10 to permit adjustment of the apparatus. The duplexing unit and receiver portions of the apparatus are supported by the lead screw 27.

An irregular casting 30 is provided with a tapped hole 31 through which the lead screw 27 is threaded to support the casting 30. The upper squared surface 37 of the casting 30 travels in a milled channel 29 in the under surface of the cover 10. In this way the casting 30 acts as a traveling nut on the lead screw 27.

As is shown in particular detail in Fig. 3, the casting 30 is provided with a hole 32 the ends of which are reamed out to receive the tubular pieces 18 and 19. These are soldered or otherwise secured into these reamed out sections of the hole thus forming with the hole 32 a continuous outer conductor for the coaxial line and extending from the flared end of one tubular section 18 to that of the other section 19.

A second casting 40 is bolted to the casting 30 by means of the flanges 43 and 33 formed on the respective castings. A cylindrical cavity is formed by the hollowed out portions of the two castings 30 and 40. This cavity is indicated by the dotted line 60 in Fig. 2. The coaxial line, the outer conductor of which is formed by the tubes 18 and 19 and the wall of the hole 32 is coupled to this cavity by means of an aperture 36 a portion of which is visible in the cutaway section of the casting 30 as shown in Fig. 3.

Bridging the center of the cavity 60 is a spark gap. This gap is formed by a discharge tube 50 shown by the dotted lines in Fig. 3. This tube 50 comprises essentially an outer glass envelope enclosing an atmosphere of gas at low pressure, a pair of disc electrodes 51 and 52 the portions of which within the envelope are formed into coaxial truncated cones that form the spark gap. The outer rim of each disc extends through the glass envelope in which it is sealed and forms an annulus by which the tube is mounted and the electrical circuit completed. For the purpose of mounting the tube these protruding annuluses of the disc electrodes 51 and 52 are clamped against the surfaces of the castings 30 and 40 by the covers 61 and 62. Four rods 63, one end of each of which is integral with the castings and the two straps 64 each of which is provided with a clamping stud 65 are provided for clamping the covers 61 and 62.

For the purpose of tuning the cavity 60 there are provided a plurality of tuning plugs 67 the ends of which extend into the cavity and the heads of which are accessible from the outside for adjustment. An additional tuning plug 68 is also provided. This plug is equipped with an adjusting rod 69 which extends through the cover plate 10 and terminates in a head 59 which is accessible by removing the auxiliary cover 11 to permit final adjustment.

The casting 40 is provided with a projecting portion 42 through which there is a hole 43 and which is provided with a saw cut or slit 44. The tubular portion 71 of the converter assembly 70 is inserted in the hole 43 and is clamped in place by the screw 45. A slot 72 in the wall of the tube 71 provides coupling between the cavity 60 and the coaxial tuning line of the converter. The enlargement of the cavity 60 by the deviation of the normal circular form of its wall at 60A provides a larger aperture for coupling with the aperture 72.

This clamp-type mounting permits the tube 71 to be rotated thus varying the portion of the slot 72, that is, in alignment with the aperture in the wall of the tuning cavity 60. In this way the coupling between the cavity and the connector can be regulated which is of advantage in adjusting the system to a condition of impedance match, particularly when changing from a rectifier element of one impedance to one of a different impedance.

Fig. 4, which is a sectional view of the converter assembly 70, is drawn to an enlarged scale as compared with the other figures. The converter comprises essentially a resonant coaxial line with provisions for introducing the signal and beating oscillator voltages and connections to a crystal rectifier unit which acts as the mixer or detector element.

The converter comprises a T-shaped frame 73 into the wall of which the tube 71 is soldered. The oppositely extending arm of the frame 73 is slotted to permit clamping the second tube 74. For this purpose screws 81 are provided. When the screws 81 are loosened the tube 74 may be slid in or out of the frame 73 to adjust the length of the coaxial line for tuning purposes. A hollow rod or tube 75 soldered into the hole in the solid end of the tube 71 provides one portion of the inner conductor of the coaxial line. The end of the tube 75 is formed into a spring chuck 76 for making good electrical contact with the wire 77 which is carried within the tube 5 and extends beyond its free end to form another section of the inner conductor. The other end of the wire 77 terminates in an enlarged portion 105 which is clamped in the chuck 107 of the carrier 106 so that the wire 77 may be moved longitudinally in and out of the chuck 80. This mechanism and its purpose will be described in detail later.

In about the center of the tube 74 there is mounted an insulated washer 78 which is held against a shoulder on the inner surface of the tube 74 by a threaded retaining ring 79. The washer 78 carries a double spring chuck 80. The right-hand end of the chuck 80 is designed to receive the end of the wire 77 and the left-hand end the terminal of the crystal cartridge 99.

An internally threaded collar 82 is screwed onto the outer threaded surface of the tube 74. This collar 82 is provided with an internally projecting flange that serves to clamp the cylindrical chuck 84 to the end of the tube 74 between the insulating washers 85. This arrangement not only supports the chuck 84 but also provides a capacity coupling between the chuck 84 and the outer conductor of the line formed at that point by the collar 82 and tube 74 through the dielectric washers 85.

The end of the tube 74 is closed by a threaded cap 86. An insulating washer 87 is cemented to the inside of this cap 86 and serves to hold the crystal cartridge firmly in place.

The collar 82 is provided with a threaded T-extension 88 on which is screwed a retaining cap 89. A solid dielectric coaxial line 91 is held in the extension 88 by this cap. This line has an inner conductor 92 that is soldered to the chuck 84 and an outer conductor 93 that is soldered to the extension 88.

The two similar branches 94 and 95 of the T block 73 are each split and the split halves are clamped together by the screws 96 to hold the solid dielectric coaxial lines 97 and 98 respectively. These lines and their terminations and mounting are similar. They serve for introducing the beating oscillations into the converter. Two are employed for alternative operation with either of two beating oscillators operating at different frequencies thus permitting the system to be readily shifted between two operating frequencies. Because of the similarity of construction only the line 97 will be described in detail.

The inner conductor 101 of the line 97 is terminated in a terminal 102 having a flat circular surface, thus providing capacity coupling to the inner conductor 75—77. The clamping action by which the line 97 is held in the block 73 not alone assures good electrical contact between the outer conductor 103 and the inner surface of the extension 94 but also serves as a means of permitting ready adjustment of the positioning of the terminal 102. Since the signal and noise ratio of the converter output is dependent upon the beating oscillator voltage impressed and the latter is determined by the amount of capacitance coupling provided by the terminal 102 it is desirable to be able to adjust the position of that element.

As was indicated above, the wire 77 is movable longitudinally to act as a switch for connecting and disconnecting the crystal. For this purpose the outer end of the wire is terminated in an enlarged end portion 105 which is held in a carrier 106 by means of the chuck nut 107. The carrier rides in a bushing 108 which is staked to the relay mounting plate 110. An electromagnetic relay 111 is mounted on this plate 110 which is bolted to the casting 40 (see Fig. 1). The tube 71 is clamped in the casting 40, as previously stated. Accordingly the bushing 108 and tube 71 are held in proper mutual relation by virtue of both being secured to the casting 40. The spring members 112 form part of the contact pile-up 113 also mounted on the plate 110. The ends of the springs 112 are forked and extend through an opening 109 in the bushing 108 to actuate the carrier 106. In the position shown in Figs. 1 and 4 the springs hold the carrier 106 in its extreme right-hand position pulling the wire 77 out of the chuck 80. When the relay 111 is energized its armature actuates the springs 112 to move the wire 77 to its left-hand position into the chuck 80 to connect the crystal in circuit. The chuck 107 permits adjustment of the position of the wire 77 to properly perform this switching operation. Readjustment of this position is usually required after each retuning of the line by the longitudinal movement of the tube 74 in the block 73.

The crystal cartridge 90 is shown partially in section. It comprises a metallic base member 115 having a threaded extension 116. A silicon crystal element 117 is cemented to the face of the extension 116. A sleeve 118 of insulating material is internally threaded and screws over the extension 116. The other terminal 119 of the cartridge is provided with a thread portion that screws into the sleeve 118 and carries on its end a fine contact wire 120. The free end of the contact wire is pointed and forms the contact with the crystal element 117.

*Operation*

The operation of the system will now be described. The schematic drawing of Fig. 5 in which the parts are given the same reference numerals as are used in the mechanical drawings may be found helpful in connection with this description. During transmission the ultra-high frequency wave energy generated by the transmitter is transmitted along the incoming coaxial line 21 finally being led to the antenna by the out-going coaxial line 15. Some of this wave energy is tapped off from the section 18—19 of the coaxial line through the aperture 36. This portion of the energy enters the cavity 60 which is adjusted to be resonant at the frequency of these waves. The gap in the gas discharge tube 50 is readily broken down by the high voltage produced in the resonant cavity 60 by the transmitter wave energy. The cavity is then short-circuited by the relatively low impedance of the gap discharge and this destroys the coupling to the resonant line 71 and crystal 117 so that practically none of the transmitter energy is diverted to the crystal.

The breakdown of the discharge gap is facilitated by a partial ionization of the gas atmosphere in the tube 50 which is maintained by a high negative voltage applied to an auxiliary electrode 121.

Upon the cessation of transmission, the spark discharge is extinguished. Any signal received in the antenna will be introduced into the system through the coaxial line 15. Under such conditions the field in the coaxial line and resonant cavity 60 will be low compared to that during transmission and the discharge tube 50 will not break down. Accordingly the resonant cavity 60 will act to couple the tuned line 71 to the coaxial line 15 for the received signals. During such periods when the transmitter is not operating its impedance will be substantially different from its impedance when operating. If the length of the transmission line from the transmitter to the aperture 36 is properly chosen there will be a sufficient impedance mismatch in the line at that point so that substantially none of the received energy is absorbed by the line and all of the energy passes through the aperture 36 into the resonant cavity 60. In order to insure such a condition the transmission line section 18—19 is longitudinally movable to place the aperture 36 at that position along the line at which the maximum energy is transmitted to the crystal. This adjustment is made by means of the knurled wheel 28 which rotates the lead screw 27 to move the assembly carried by the casting 30 longitudinally.

The converter input circuit comprises the tuned coaxial line 71. The inner conductor of this line comprises two main sections 75 and 77. During the operation of the system the relay 111 is energized to move the wire 77 to the left into the chuck 88 and so complete the circuit to the crystal through the terminal 119 and the contact wire 120. The remainder of the circuit is completed from the crystal 117 through the base 115, chuck 84 and the high frequency by-pass capacitor 85 formed by the chuck 84, insulating washers 85 and the collar 82 which forms a part of the outer conductor of the tuned line. The other end of the line is short-circuited by the soldered connection between the inner conductor 75 and the outer conductor 71.

The incoming signal energy is introduced into the line from the resonant cavity 60 by allowing the magnetic lines of force in cavity 60 to link the tuned coaxial line 71 through the aperture 72 located at the short-circuited point. This method of coupling to the tuned line has several advantages over prior methods where the input aperture was located at a point one or more half wavelengths away from the short-circuit point. Chief among these is the fact that it reduces both the electrical and mechanical lengths of the line. The reduction in the electrical length of the line results in a reduction of the dissipation in the line and consequently increases the useful signal output. The fact that the mechanical length can be reduced and particularly at that point in the line is of considerable advantage in construction as can be seen from a study of the assembly as shown in Fig. 1.

Beating oscillations are introduced through the coaxial lines 97 or 98, only one of which is effective at a time. The use of two beating oscillators (not shown) connected through their respective lines permits the operation of the system to be readily shifted from one frequency to another. Capacity coupling to the inner conductor of the line is effected by the disc terminal 102. As was pointed out previously the magnitude of beating oscillator input may be controlled by adjusting the position of the lines 97 or 98 in the respective branches 94 and 95 of the T-block 73 after which they are firmly clamped in place by the screws 96.

The intermediate frequency signal output produced by the rectifying action of the crystal 117 on the signal and beating oscillator inputs is taken off through the coaxial line 91. For this purpose the inner conductor 92 is soldered to the chuck 84 which contacts the base 115 of the crystal cartridge.

While the condition for optimum coupling from the cavity 60 to the coaxial line 71—75 at the fundamental frequency of the signal waves is with the aperture 72 at the short-circuited point of the coaxial line, other considerations may influence the designer to depart from the exact arrangement. A harmonic frequency may be suppressed by locating the coupling aperture at a distance from the short-circuited point of the resonant coaxial line equal to one-quarter of the wavelength of the harmonic. Thus it has been found that by locating the aperture a distance of one-twelfth of the wavelength of the incoming signal from the short-circuited end of the line the third harmonic may be greatly attenuated without materially affecting the transmission at the fundamental frequency.

Fig. 6 is a sectional view of a modification of that portion of the structure of Fig. 5 between the dash-dot lines 6—6 thereof. In this modification the aperture 72A is located at the distance $\lambda/12$ from the point at which the inner conductor 75 and the outer conductor 71 are connected together; where $\lambda$ equals the wavelength at the fundamental frequency of the oscillations supplied by the transmitter to the coaxial line 20. As pointed out above, it has been found that such a structure will introduce a high loss at the third harmonic without materially deteriorating the transmission at the fundamental frequency.

The arrangement of Fig. 6 has been found useful in some applications of the invention. Where the pulse energy supplied by the transmitter to the line 20 is very high the energy at harmonic frequencies may be sufficiently high to cause damage to the crystal converter even though it represents a very small percentage of the energy at fundamental frequency. The TR box cavity 60 because of its structure or because of a particular relative adjustment of the tuning plugs 67 may not afford adequate protection against harmonics while being effective at the fundamental. On the other hand, the resonant input line 71 will not give efficient transmission at even harmonics and so protect the crystal against their effects. By the addition of the structural modification shown in Fig. 6, which protects against the third harmonic adequate protection against all the high energy harmonics is provided.

This particular feature of the invention is shown and discussed with respect to a particular embodiment in which it is designed to provide a loss at the third harmonic because such a specific adjustment has been found desirable in the general type of systems in which the embodiment herein shown has been used. However, applicant's invention is not so limited and by locating the aperture at different positions other chosen harmonics may be discriminated against; for example λ/8 for the second harmonic, λ/16 for the fourth harmonic and so on.

The term "wave cavity" is used herein as generic to dielectric wave guides whether employed in the more conventional sense as transmission elements or as circuit elements such as resonant chambers.

What is claimed is:

1. In a receiver for ultra-high frequency waves, a wave cavity excited by received waves and provided with an output aperture, a coaxial line having an outer conductor, a first section of inner conductor comprising a tube having one end directly connected to said outer conductor, a spring contact chuck terminating the other end of said tube, and a second section of inner conductor mounted within said first section and projecting beyond the chuck termination thereof and free for longitudinal movement, said outer conductor having an aperture at substantially the point of connection to said first section of inner conductor and in alignment with the output aperture of said wave cavity, a rectifying device, and means for mounting said rectifying device within said outer conductor and including a low impedance electrical path for ultra-high frequency waves between one terminal of said rectifying device and said outer conductor and a chuck connected to the other terminal of said rectifying device and arranged to receive the free end of said second section of inner conductor.

2. In a transmission system, a wave cavity having an output aperture, a resonant coaxial line comprising an inner conductor and an outer conductor connected together at one end, and an aperture in said outer conductor in juxtaposition to said output aperture and at a distance from said end equal to one-quarter wavelength of a wave to be discriminated against and of negligible length compared with the wavelength of a lower frequency wave to be transmitted.

3. In a transmission system, a wave cavity having an output aperture, a resonant coaxial line comprising an inner conductor and an outer conductor connected together at one end, and an aperture in said outer conductor in juxtaposition to said output aperture and at a distance from said end short with respect to the wavelength of waves to be transmitted between said cavity and said coaxial line and equal to one-quarter wavelength of a higher frequency wave to be discriminated against.

4. In a transmission system, a wave cavity having an output aperture, a coaxial line comprising an inner conductor and an outer conductor connected together at one end and of such length that said line is resonant at the frequency of a wave to be transmitted between said cavity and said line, and an aperture in said outer conductor in juxtaposition to said output aperture and at a distance from said end equal to one-quarter wavelength of an odd harmonic of the wave to be transmitted between said cavity and said line.

5. In a receiver for ultra-high frequency waves, a wave cavity excited by received waves and provided with an output aperture, a coaxial line having an outer conductor, a first section of inner conductor comprising a tube having one end directly connected to said outer conductor, a spring contact chuck terminating the other end of said tube, and a second section of inner conductor mounted within said first section and projecting beyond the chuck termination thereof and free for longitudinal movement, said outer conductor having an aperture at substantially the point of connection to said first section of inner conductor and in alignment with the output aperture of said wave cavity, a rectifying device, means for mounting said rectifying device within said outer conductor and including a low impedance electrical path for ultra-high frequency waves between one terminal of said rectifying device and said outer conductor and a chuck connected to the other terminal of said rectifying device and arranged to receive the free end of said second section of inner conductor, a tubular guide extending beyond that end of said outer conductor connected to said first section of inner conductor, a carriage member riding within said tubular guide and carrying said second section of inner conductor, and electromagnetic means for moving said carriage member longitudinally within said guide to move the free end of said second section of inner conductor in and out of said chuck connected to the other terminal of said rectifying device.

WILLIAM W. MUMFORD.

REFERENCES CITED

The following references are of record in the file of this patent:

UNITED STATES PATENTS

| Number | Name | Date |
| --- | --- | --- |
| 2,241,119 | Dallenbach | May 6, 1941 |
| 2,213,104 | Gluyas | Aug. 27, 1940 |
| 2,227,604 | Smith | Jan. 7, 1941 |
| 2,235,521 | Higgins | Mar. 18, 1941 |
| 2,143,671 | Zottu | Jan. 10, 1939 |
| 2,106,768 | Southworth | Feb. 1, 1938 |
| 2,235,722 | Murray | Mar. 18, 1941 |
| 2,153,104 | Southworth | Apr. 11, 1939 |